(12) United States Patent
Sawatzky

(10) Patent No.: US 10,232,757 B2
(45) Date of Patent: Mar. 19, 2019

(54) PICK-UP TRUCK CARGO LIFT SYSTEM AND METHOD

(71) Applicant: Bernardo Sawatzky, Roland (CA)

(72) Inventor: Bernardo Sawatzky, Roland (CA)

( * ) Notice: Subject to any disclaimer, the term of this patent is extended or adjusted under 35 U.S.C. 154(b) by 67 days.

(21) Appl. No.: 15/273,507

(22) Filed: Sep. 22, 2016

(65) Prior Publication Data
US 2018/0079345 A1   Mar. 22, 2018

(51) Int. Cl.
*B60P 1/44* (2006.01)
*B60P 1/02* (2006.01)
*B60P 1/48* (2006.01)
*G08C 17/02* (2006.01)

(52) U.S. Cl.
CPC ........... *B60P 1/4414* (2013.01); *B60P 1/022* (2013.01); *B60P 1/483* (2013.01); *G08C 17/02* (2013.01)

(58) Field of Classification Search
CPC .......... B60P 1/022; B60P 1/4414; B60P 1/483
USPC ................................. 414/477, 478, 549, 556
See application file for complete search history.

(56) References Cited

U.S. PATENT DOCUMENTS

| | | | | |
|---|---|---|---|---|
| 1,052,096 A | * | 2/1913 | Schulze | B60P 1/6427 212/260 |
| 2,732,960 A | * | 1/1956 | Nilson | B60P 1/4414 414/549 |
| 2,911,118 A | * | 11/1959 | Tapp | B60P 1/483 414/549 |
| 3,305,112 A | | 2/1967 | Brown | |
| 3,404,793 A | * | 10/1968 | Pinkert | B60P 1/483 414/501 |
| 3,467,266 A | | 9/1969 | Vanderjagt | |
| 3,885,686 A | * | 5/1975 | Siebring | B60P 1/483 414/549 |
| 4,032,201 A | * | 6/1977 | Jones | F16C 13/04 384/574 |
| 4,240,477 A | * | 12/1980 | Horn | B27B 25/04 144/245.1 |
| 4,278,390 A | * | 7/1981 | Ahearn | B66F 9/065 414/549 |
| 4,579,503 A | * | 4/1986 | Disque | B60P 1/445 414/546 |
| 4,594,041 A | | 6/1986 | Hostetler | |
| 4,702,662 A | * | 10/1987 | Marlett | B60P 3/122 298/12 |
| 4,787,809 A | | 11/1988 | Zrostlik | |
| 5,158,419 A | * | 10/1992 | Kempf | A61G 3/06 414/539 |
| 5,253,973 A | * | 10/1993 | Fretwell | B60P 1/445 414/541 |
| 5,328,320 A | | 7/1994 | Farrow et al. | |
| 5,597,282 A | | 1/1997 | Hoffman et al. | |

(Continued)

FOREIGN PATENT DOCUMENTS

DE    -3616642 A1 * 11/1987 .......... E04G 21/161

*Primary Examiner* — James Keenan
(74) *Attorney, Agent, or Firm* — Integrity Patent Group, PLC; Charles E. Runyan

(57) ABSTRACT

A cargo lift system and method for a pickup truck or similar vehicle. The apparatus fits within the cargo box of a pickup truck and can be deployed to positions above and below the cargo bed. The system includes a set of movement synchronizers configured to synchronize movement of the lifting and lowering structures to prevent binding and racking during operation, thus allowing the construction of the apparatus to be more compact and lighter in weight.

16 Claims, 10 Drawing Sheets

(56) References Cited

U.S. PATENT DOCUMENTS

| | | | | |
|---|---|---|---|---|
| 5,651,657 | A | * | 7/1997 | Poindexter ................ B60P 1/00 |
| | | | | 187/222 |
| 6,019,567 | A | * | 2/2000 | Lutkus .................... B60P 1/003 |
| | | | | 414/501 |
| 6,077,024 | A | | 6/2000 | Trueblood |
| 6,102,648 | A | * | 8/2000 | Fretwell ................... A61G 3/06 |
| | | | | 14/69.5 |
| 6,666,643 | B1 | | 12/2003 | Heynssens |
| 7,111,884 | B2 | | 9/2006 | Johnson |
| 8,444,201 | B1 | | 5/2013 | Crawford et al. |
| 8,534,981 | B1 | | 9/2013 | Bortz |
| 2006/0182573 | A1 | * | 8/2006 | Taylor ...................... B60P 1/02 |
| | | | | 414/477 |
| 2007/0020076 | A1 | | 1/2007 | Heynssens |

\* cited by examiner

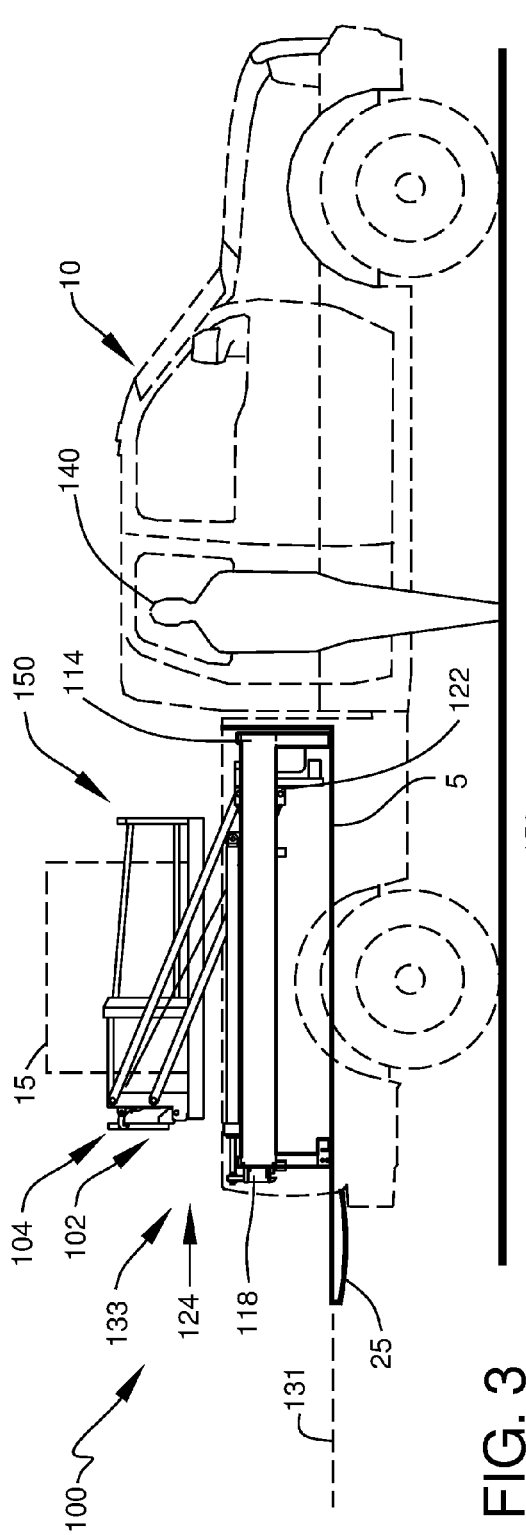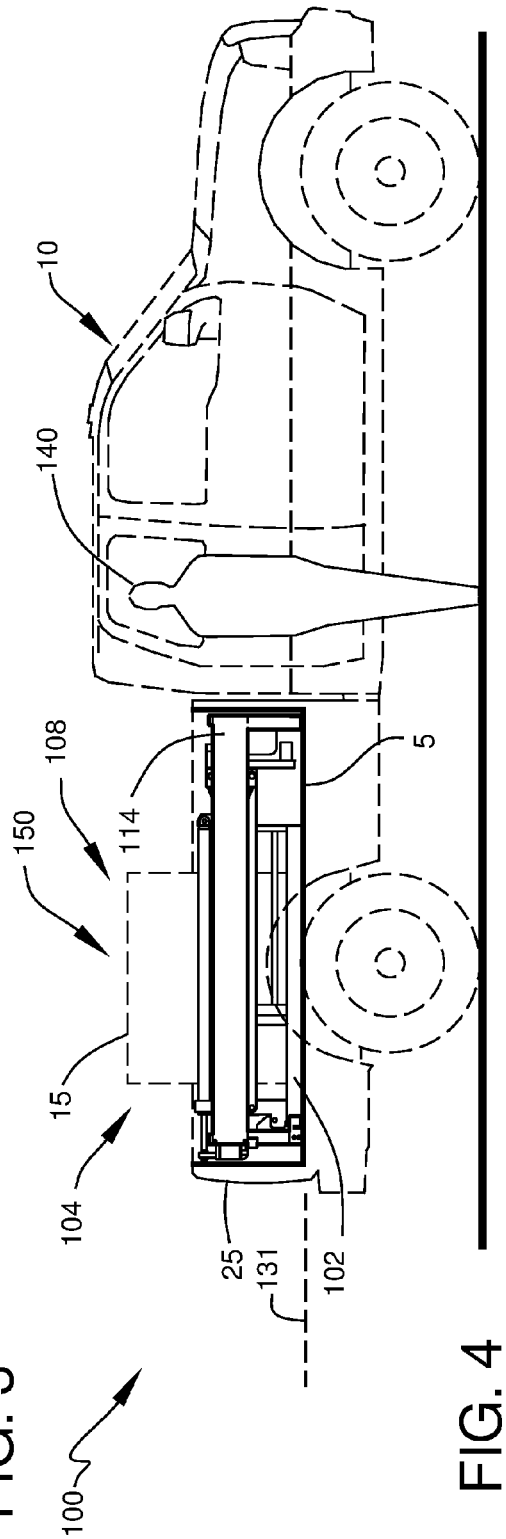

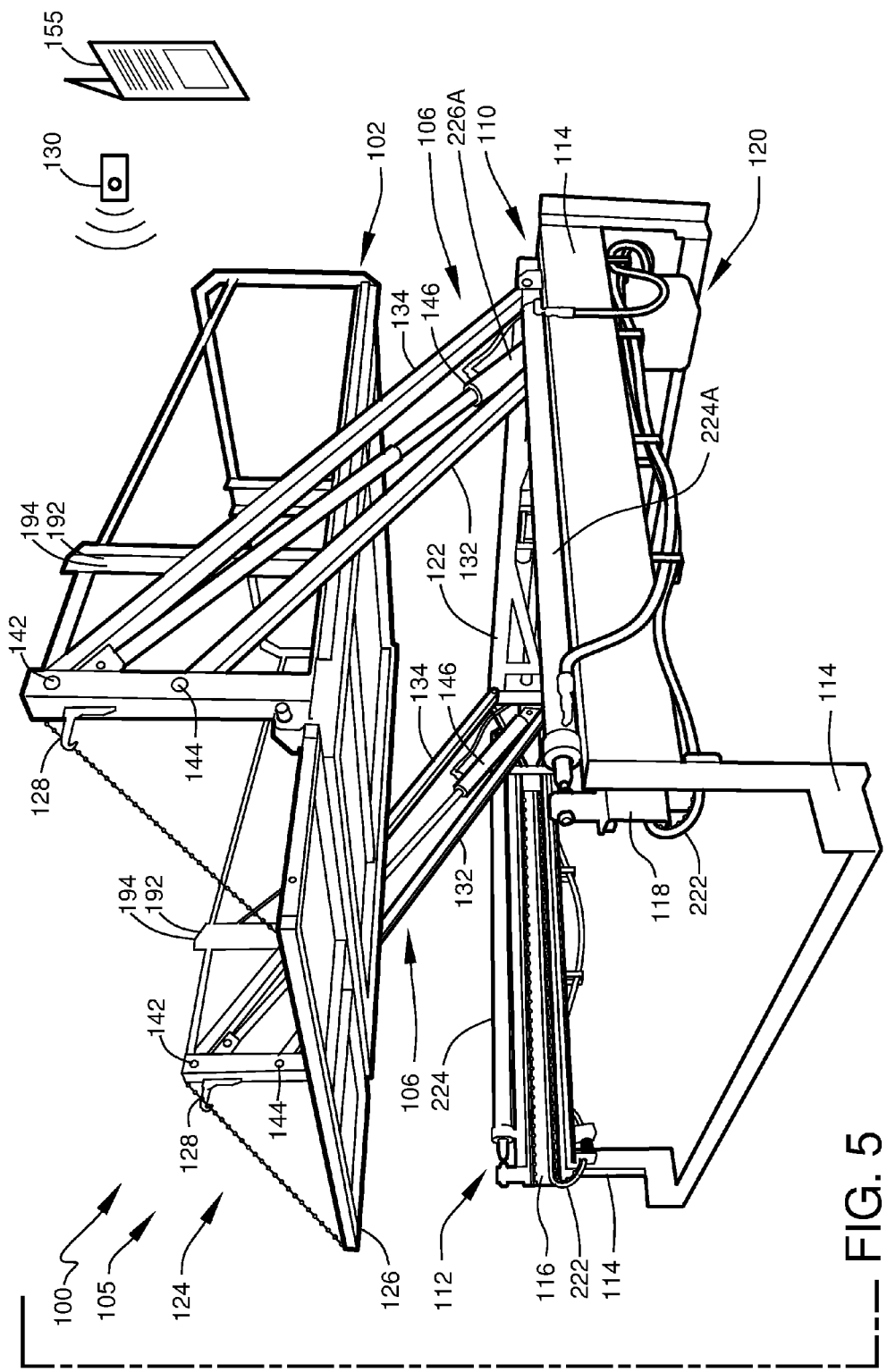

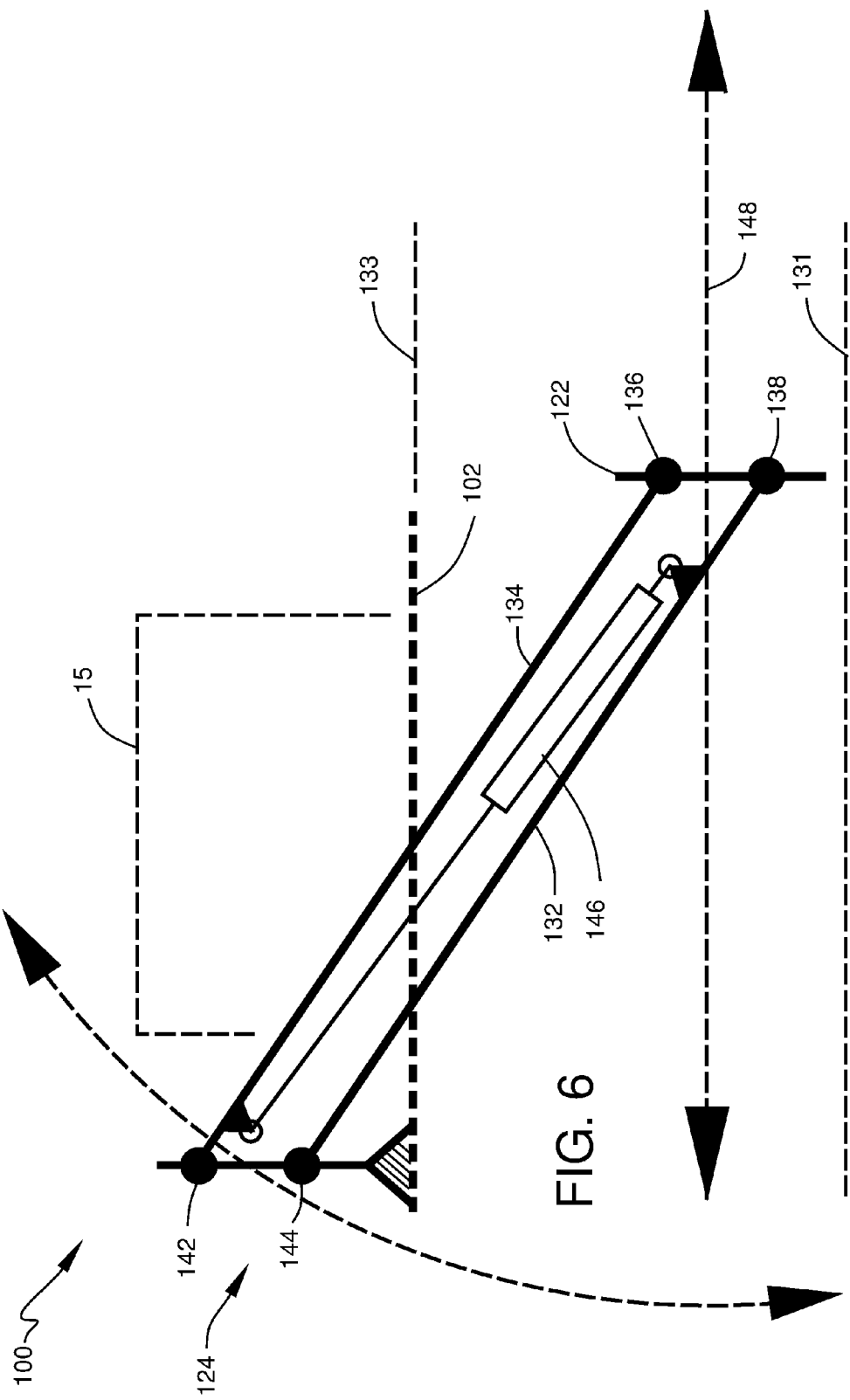

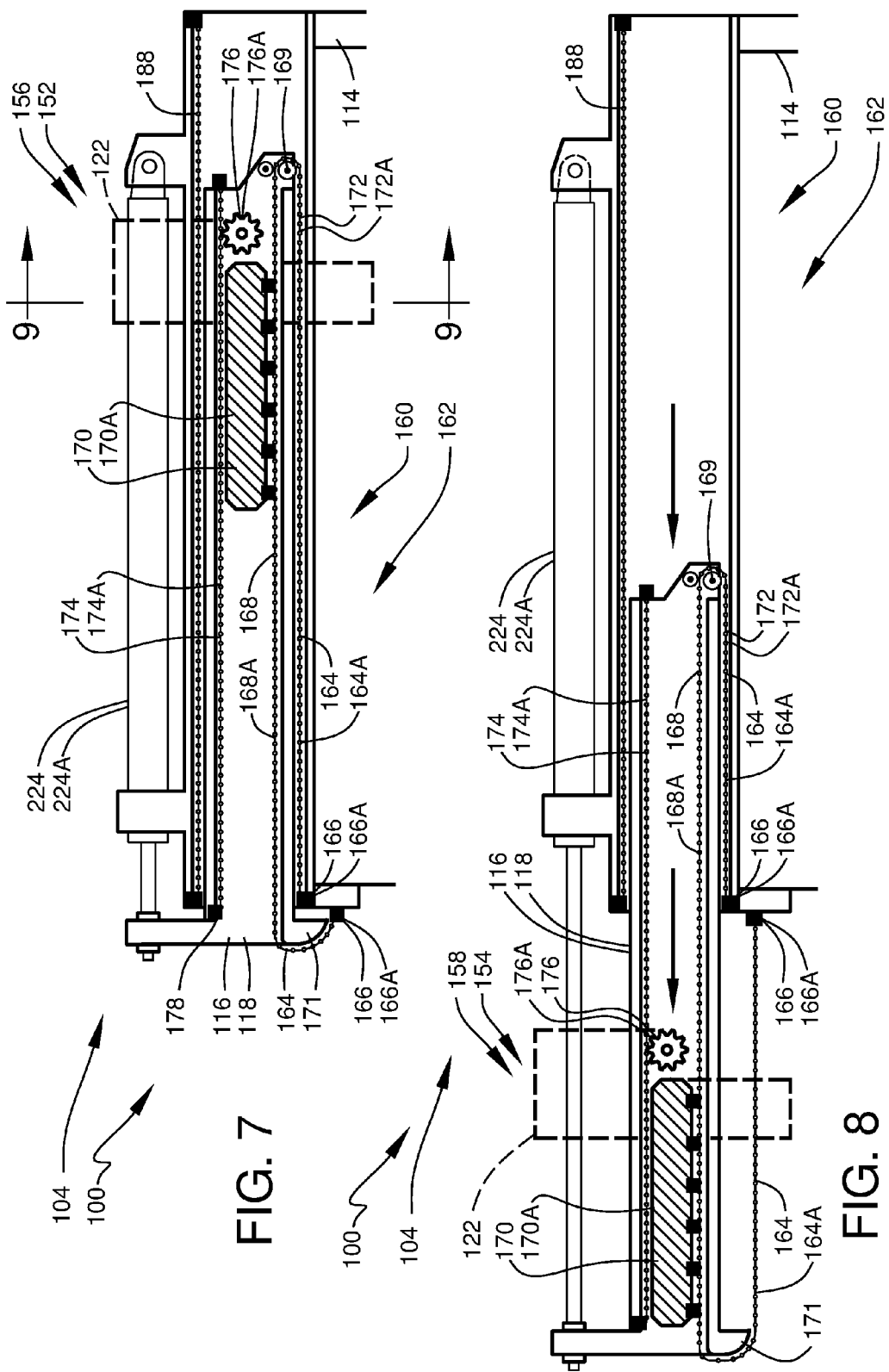

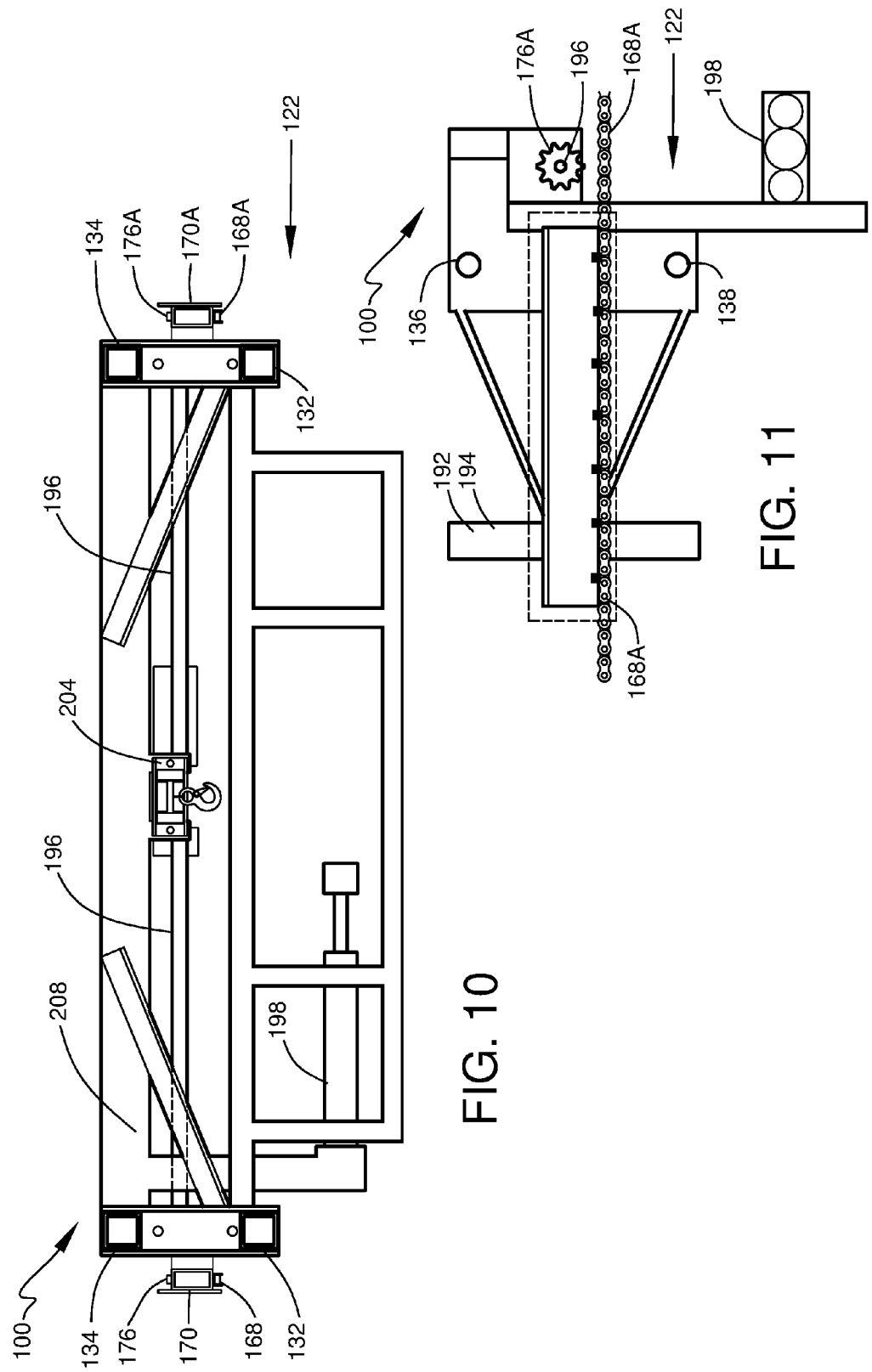

PICK-UP TRUCK CARGO LIFT SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of material handling and more specifically relates to load-transporting vehicles having a loading platform to raise the load to the level of the load-transporting vehicle.

2. Description of Related Art

Off-road vehicles in particular are very dangerous to load and off load from truck beds due to their size and weight. A small error in judgement during the loading and unloading procedure can result in damage to the equipment and serious injury to the operator.

The most common method of loading a wheeled vehicle into the cargo bed of a truck is to use a set of temporary ramps. The loading ramps are intended to allow a user to push or drive a vehicle to be transported from a ground level into the elevated cargo bed of the truck. Too often, equipment damage and serious personal injury has occurred when using such ramps, particularly when users attempt to ride their vehicles up and down the loading ramps. Factors such as uneven ground surfaces, improper ramp spacing, overly-steep ramp angles, user proximity to the vehicle during loading, etc., are attributed to having played a role in the many reported cases of damage and injury. Clearly, new systems and methods to assist the safe loading and off-loading of off-road vehicles into and from truck beds would benefit many.

Several attempts have been made to solve the above-mentioned problems such as those found in U.S. Pat. No. 8,534,981 to Bortz, which relates to a truck bed bale loader auxiliary assembly. The described truck bed bale loader auxiliary assembly includes an auxiliary assembly for attachment to a truck bed, the truck bed having pivoting bale lift arms, and the truck bed further having a hydraulic ram powered bale arm actuator, the assembly including a cargo carrying frame, left and right releasably attachable and pivoting mounts for interconnecting the cargo carrier and distal ends of the bale lift arms, and a pair of cargo leveling arms pivotally mounted to span between and interconnect the truck bed and with the cargo carrier for simultaneous and substantially parallel leveling arm motion, the leveling arm motion stabilizing the cargo carrier during pivoting motions of the bale lift arms.

BRIEF SUMMARY OF THE INVENTION

In view of the foregoing disadvantages inherent in the known material handling art, the present disclosure provides a novel pick-up truck cargo lift system and method. The general purpose of the present disclosure, which will be described subsequently in greater detail, is to provide a pick-up truck cargo lift system and method.

A system for loading a cargo bed of a pickup truck is disclosed herein. The system for loading a cargo bed of a pickup truck includes a system for loading a cargo bed of a pickup truck including; in combination, a bed mount, a first carriage structure, a second carriage structure, a load lifting assembly, and a driver assembly. The bed mount is configured to mount to the cargo bed and provide structural support to the system. The first carriage structure is movably coupled to the bed mount and is translatable between a first retracted position and a first extended position. The first retracted position of the first carriage structure is substantially within the cargo bed, and forward of the first extended position. The second carriage structure is movably coupled to the bed mount and is translatable between a second retracted position and a second extended position, the second retracted position being substantially within the cargo bed, and forward of the second extended position. The load lifting assembly is coupled to and supported by both the first carriage structure and the second carriage structure. The load lifting assembly is movable between a stowed position substantially within the cargo bed, and a deployed position substantially outside of the cargo bed. The load lifting assembly includes a support frame movably affixed to the first carriage structure and the second carriage structure, a load-supporting platform configured to support a payload of the cargo bed, and an articulated linkage linking the load-supporting platform with the support frame. The articulated linkage is configured to articulate the load-supporting platform between a first elevation of the stowed position and a second elevation associated with the deployed position.

The driver assembly is configured to translate the first carriage structure between the first retracted position and the first extended position and the second carriage structure between the second retracted position and the second extended position. In addition, the driver assembly is configured translate the load lifting assembly between the stowed position and the deployed position, and is further configured to articulate the load-supporting platform between the first elevation and the second elevation.

Furthermore, the system includes a first movement synchronizer configured to synchronize movement of the first carriage structure, the second carriage structure, and the load-supporting platform in translation. The movement synchronizer includes a gear and chain assembly having a first deployment roller chain. The first deployment roller chain includes a first set of opposing end portions affixed with the bed mount and a first intermediate chain portion affixed to a first side of the support frame. The first intermediate chain portion forms a first chain-loop portion configured to movably engage the first carriage structure, a first carriage-mounted roller chain affixed to the first carriage structure and aligned with the first deployment roller chain, a first synchronizer gear operably engaged with the first carriage-mounted roller chain. In addition, the movement synchronizer includes a second deployment roller chain having a second set of opposing end portions affixed with the bed mount and a second intermediate chain portion affixed to a second side of the support frame, the second intermediate chain portion forming a second chain-loop portion configured to movably engage the second carriage structure. In addition, the movement synchronizer includes a second carriage-mounted roller chain affixed to the second carriage structure and aligned with the second deployment roller chain, a second synchronizer gear operably engaged with the second carriage-mounted roller chain, and a linking shaft configured to link the rotation of the first synchronizer gear with the rotation of the second synchronizer gear.

Also, it provides a system wherein the first carriage-mounted roller chain includes a first bearing surface, the second carriage-mounted roller chain includes a second bearing surface, the support frame of the load lifting assembly includes a first bearing engager configured to engage the first bearing surface of the first carriage-mounted roller chain during the translation and a second bearing engager configured to engage the second bearing surface of the second carriage-mounted roller chain during the translation.

In addition, it provides a system wherein the driver assembly includes a translation motor subassembly configured to translate the first carriage structure between the first retracted position and the first extended position, the second carriage structure between the second retracted position and the second extended position, the load lifting assembly between the stowed position and the deployed position, and an actuator subassembly configured to articulate the load-supporting platform between the first elevation and the second elevation.

Moreover, it provides a system wherein the translation motor subassembly includes a first hydraulically-actuated cylinder operably coupled with the bed mount and the first carriage structure, a second hydraulically-actuated cylinder operably coupled with the bed mount and the second carriage structure, a source of pressurized hydraulic fluid, and a hydraulic control circuit to control the communication of pressurized hydraulic fluid between the source of pressurized hydraulic fluid, the first hydraulically-actuated cylinder, and the second hydraulically-actuated cylinder. Further, it provides a system wherein the pickup truck has a right-side and a left-side, the actuator subassembly includes a right-side hydraulically-actuated cylinder and a left-side hydraulically-actuated cylinder, the right-side hydraulically-actuated cylinder and the left-side hydraulically-actuated cylinder configured to articulate the load-supporting platform between the stowed position and the deployed position, a source of pressurized hydraulic fluid, and a hydraulic control circuit to control the communication of pressurized hydraulic fluid between the source of pressurized hydraulic fluid, the right-side actuator, and the left-side actuator.

The system further includes a second movement synchronizer configured to synchronize the articulation of the right-side actuator and the left-side actuator, the second movement synchronizer including a right-side hydraulically-actuated slave cylinder operably coupled to the right-side hydraulically-actuated cylinder, a left-side hydraulically-actuated slave cylinder operably coupled to the left-side hydraulically-actuated cylinder, a hydraulically-actuated master cylinder configured to contemporaneously operate the right-side hydraulically-actuated slave cylinder and the left-side hydraulically-actuated slave cylinder, the hydraulically-actuated master cylinder operably coupled with the source of pressurized hydraulic fluid and controlled by the hydraulic control circuit. Moreover, it provides a system wherein the bed mount includes a first friction-reducing bearing surface and a second friction-reducing bearing surface, the first carriage structure includes a first bearing surface engager configured to engage the first friction-reducing bearing surface during the translation, and the second carriage structure includes a second bearing surface engager configured to engage the second friction-reducing bearing surface during the translation. Additionally, it provides a system wherein the first friction-reducing bearing surface and the second friction-reducing bearing surface each comprise a segment of roller chain rigidly fixed to the bed mount. Also, the system further includes a remote control configured to operate the driver assembly. In addition, it provides a system wherein the remote control includes a wireless radio configured to wirelessly issue commands to the driver assembly. And, it provides a system wherein the second elevation of the load-supporting platform is above the first elevation of the load-supporting platform. Further, it provides a system wherein the second elevation of the load-supporting platform is below the first elevation of the load-supporting platform. Even further, it provides a system wherein the stowed position of the load-supporting platform is substantially within the cargo bed of the pickup truck, the deployed position of the load-supporting platform is substantially outside the cargo bed of the pickup truck, the load-supporting platform includes the first elevation when in the stowed position, and the second elevation of the load-supporting platform includes elevations above and below the stowed position of the load-supporting platform. The system further includes a winch configured to assist winching of the payload onto the load-supporting platform.

Another embodiment of the system for loading a cargo bed of a pickup truck is also disclosed herein. The alternate embodiment of the present system includes a bed mount, a first carriage structure, a second carriage structure, a load lifting assembly, and a driver assembly. The bed mount is configured to mount to the cargo bed and provide structural support to the system. The first carriage structure is movably coupled to the bed mount and is translatable between a first retracted position and a first extended position. The first retracted position of the first carriage structure is substantially within the cargo bed, and forward of the first extended position. The second carriage structure is movably coupled to the bed mount and is translatable between a second retracted position and a second extended position, the second retracted position being substantially within the cargo bed, and forward of the second extended position. The load lifting assembly is coupled to and supported by both the first carriage structure and the second carriage structure. The load lifting assembly is movable between a stowed position substantially within the cargo bed, and a deployed position substantially outside of the cargo bed. The load lifting assembly includes a support frame movably affixed to the first carriage structure and the second carriage structure, a load-supporting platform configured to support a payload of the cargo bed, and an articulated linkage linking the load-supporting platform with the support frame. The articulated linkage is configured to articulate the load-supporting platform between a first elevation of the stowed position and a second elevation associated with the deployed position.

The driver assembly is configured to translate the first carriage structure between the first retracted position and the first extended position and the second carriage structure between the second retracted position and the second extended position. In addition, the driver assembly is configured translate the load lifting assembly between the stowed position and the deployed position, and is further configured to articulate the load-supporting platform between the first elevation and the second elevation.

Furthermore, the system includes a first movement synchronizer configured to synchronize movement of the first carriage structure, the second carriage structure, and the load-supporting platform in translation. The movement synchronizer includes a gear and chain assembly having a first deployment roller chain. The first deployment roller chain includes a first set of opposing end portions affixed with the bed mount and a first intermediate chain portion affixed to a first side of the support frame. The first intermediate chain portion forms a first chain-loop portion configured to movably engage the first carriage structure, a first carriage-mounted roller chain affixed to the first carriage structure and aligned with the first deployment roller chain, a first synchronizer gear operably engaged with the first carriage-mounted roller chain. In addition, the movement synchronizer includes a second deployment roller chain having a second set of opposing end portions affixed with the bed mount and a second intermediate chain portion affixed to a second side of the support frame, the second intermediate chain portion forming a second chain-loop portion configured to movably engage the second carriage structure. In addition, the movement synchronizer includes a second carriage-mounted roller chain affixed to the second carriage structure and aligned with the second deployment roller chain, a second synchronizer gear operably engaged with the second carriage-mounted roller chain, and a linking shaft configured to link the rotation of the first synchronizer gear with the rotation of the second synchronizer gear.

Also, it provides a system wherein the first carriage-mounted roller chain includes a first bearing surface, the second carriage-mounted roller chain includes a second bearing surface, the support frame of the load lifting assembly includes a first bearing engager configured to engage the first bearing surface of the first carriage-mounted roller chain during the translation and a second bearing engager configured to engage the second bearing surface of the second carriage-mounted roller chain during the translation.

In addition, it provides a system wherein the driver assembly includes a translation motor subassembly configured to translate the first carriage structure between the first retracted position and the first extended position, the second carriage structure between the second retracted position and the second extended position, the load lifting assembly between the stowed position and the deployed position, and an actuator subassembly configured to articulate the load-supporting platform between the first elevation and the second elevation.

Moreover, it provides a system wherein the translation motor subassembly includes a first hydraulically-actuated cylinder operably coupled with the bed mount and the first carriage structure, a second hydraulically-actuated cylinder operably coupled with the bed mount and the second carriage structure, a source of pressurized hydraulic fluid, and a hydraulic control circuit to control the communication of pressurized hydraulic fluid between the source of pressurized hydraulic fluid, the first hydraulically-actuated cylinder, and the second hydraulically-actuated cylinder. Further, it provides a system wherein the pickup truck has a right-side and a left-side, the actuator subassembly includes a right-side hydraulically-actuated cylinder and a left-side hydraulically-actuated cylinder, the right-side hydraulically-actuated cylinder and the left-side hydraulically-actuated cylinder configured to articulate the load-supporting platform between the stowed position and the deployed position, a source of pressurized hydraulic fluid, and a hydraulic control circuit to control the communication of pressurized hydraulic fluid between the source of pressurized hydraulic fluid, the right-side actuator, and the left-side actuator.

The system further includes a second movement synchronizer configured to synchronize the articulation of the right-side actuator and the left-side actuator, the second movement synchronizer including a right-side hydraulically-actuated slave cylinder operably coupled to the right-side hydraulically-actuated cylinder, a left-side hydraulically-actuated slave cylinder operably coupled to the left-side hydraulically-actuated cylinder, a hydraulically-actuated master cylinder configured to contemporaneously operate the right-side hydraulically-actuated slave cylinder and the left-side hydraulically-actuated slave cylinder, the hydraulically-actuated master cylinder operably coupled with the source of pressurized hydraulic fluid and controlled by the hydraulic control circuit. Moreover, it provides a system wherein the bed mount includes a first friction-reducing bearing surface and a second friction-reducing bearing surface, the first carriage structure includes a first bearing surface engager configured to engage the first friction-reducing bearing surface during the translation, and the second carriage structure includes a second bearing surface engager configured to engage the second friction-reducing bearing surface during the translation. Additionally, it provides a system wherein the first friction-reducing bearing surface and the second friction-reducing bearing surface each comprise a segment of roller chain rigidly fixed to the bed mount.

Also, it provides a system further including a remote control configured to operate the driver assembly. In addition, it provides a system wherein the remote control includes a wireless radio configured to wirelessly issue commands to the driver assembly. Furthermore, it provides a system wherein the second elevation of the load-supporting platform is above the first elevation of the load-supporting platform. Further, it provides a system wherein the second elevation of the load-supporting platform is below the first elevation of the load-supporting platform. Even further, it provides a system wherein the stowed position of the load-supporting platform is substantially within the cargo bed of the pickup truck, the deployed position of the load-supporting platform is substantially outside the cargo bed of the pickup truck, the load-supporting platform includes the first elevation when in the stowed position, and the second elevation of the load-supporting platform includes elevations above and below the stowed position of the load-supporting platform. Even further, the system further includes a winch configured to assist winching of the payload onto the load-supporting platform. Even further, the vehicle loading system further includes a set of instructions; and wherein the system is arranged as a kit.

According to another embodiment, a vehicle loading method is also disclosed herein. The vehicle loading method includes the steps of providing a bed mount configured to mount to a cargo bed of a pickup truck to provide structural support to the system; providing a first carriage structure movably coupled to the bed mount, the first carriage structure translatable between a first retracted position and a first extended position, the first retracted position being substantially within the cargo bed, and forward of the first extended position; providing a second carriage structure movably coupled to the bed mount, the second carriage structure translatable between a second retracted position and a second extended position, the second retracted position being substantially within the cargo bed, and forward of the second extended position; providing a load lifting assembly coupled to and supported by the first carriage structure and the second carriage structure, the load lifting assembly movable between a stowed position substantially within the cargo bed, and a deployed position substantially outside of the cargo bed, the load lifting assembly including a support frame movably affixed to the first carriage structure and the second carriage structure, a load-supporting platform configured to support a payload of the cargo bed, and an articulated linkage linking the load-supporting platform with the support frame, the articulated linkage configured to articulate the load-supporting platform between a first elevation and a second elevation; and providing a driver assembly configured to translate the first carriage structure between the first retracted position and the first extended position, the second carriage structure between the second retracted position and the second extended position, the load lifting assembly between the stowed position and the deployed position, and further configured to articulate the load-supporting platform between the first elevation and the second elevation.

The method further includes the steps of providing a first movement synchronizer to synchronize movement of the first carriage structure, the second carriage structure, and the load-supporting platform in translation, and providing a second movement synchronizer to synchronize the articulation of the right-side actuator and the left-side actuator, the second movement synchronizer.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and methods of use for the present disclosure, a cargo handling system and method constructed and operative according to the teachings of the present disclosure.

FIG. 3 is a side view of the vehicle and cargo handling system in an alternate configuration, according to the embodiment of FIG. 1.

FIG. 4 is a side view of the vehicle and cargo handling system in an alternate configuration, according to the embodiment of FIG. 1.

FIG. 5 is a perspective view of cargo handling system, removed from the vehicle for clarity of description, according to the embodiment of FIG. 1.

FIG. 6 is a schematic diagram, generally illustrating operational kinematics of the cargo handling system, according to the embodiment of FIG. 1.

FIG. 7 is a side view, diagrammatically showing a set of telescopically extendable and retractable support members of the cargo handling system, according to the embodiment of FIG. 1.

FIG. 8 is a side view, diagrammatically illustrating the telescopically extendable and retractable support members of FIG. 7, in an extended condition, according to the embodiment of FIG. 1.

FIG. 10 is a front view of a support frame of a load lifting assembly, according to the embodiment of FIG. 1.

FIG. 11 is a side view of the support frame of FIG. 10, according to the embodiment of FIG. 1.

DETAILED DESCRIPTION

As discussed above, embodiments of the present disclosure relate to load-transporting vehicles and more particularly to a pick-up truck cargo lift system and method as used to load and unload a cargo bed of a pickup truck.

Generally, the pick-up truck cargo lift system includes a bed lift for a pick-up truck. The lift folds into and out of the cargo bed of the truck. The cargo being lifted remains level throughout the lift and lowering. When fully deployed, the lift platform rests completely flat on the road or ground for easy loading or off-loading of items, with no height restriction. Items can be fastened directly to the lift platform rather than having to be secured to the truck, making loading/offloading easier.

The lift is powered to allow for any type of cargo to be easily, quickly, and safely loaded or unloaded with remote operation/control. All off-road vehicles can be secured more quickly and safely than with traditional ramps/straps, as they can be locked to the lift with special attachments. Preferred embodiments of the unit can lift up to about 1000 lbs. The unique mounting and power supply takes up very little room inside the truck bed keeping vital storage space in the truck box to a maximum. The installed system fits entirely within the cargo bed to allow standard covers and truck bed/box covers to be used.

Off-road vehicles in particular are very dangerous to load and offload from truck beds due to their size and weight, a small error in judgement can have serious consequences. Traditional ramps/strapping/hold downs often loosen or come undone and allow vehicles to shift and get damaged and need repair. The present system provides a compact lifting system in the truck bed that lets off-road vehicles to be driven on a lowered platform and then be quickly and easily locked to the platform for lifting. The apparatus keeps all items resting on the lift platform level during the lift, thus making this procedure much safer and quicker. A remote control feature keeps the user at a safe distance during operation. Embodiments of the device can raise a payload up to 70 inches above the ground surface to place a payload, for example, on an elevated loading dock.

Figure 1:
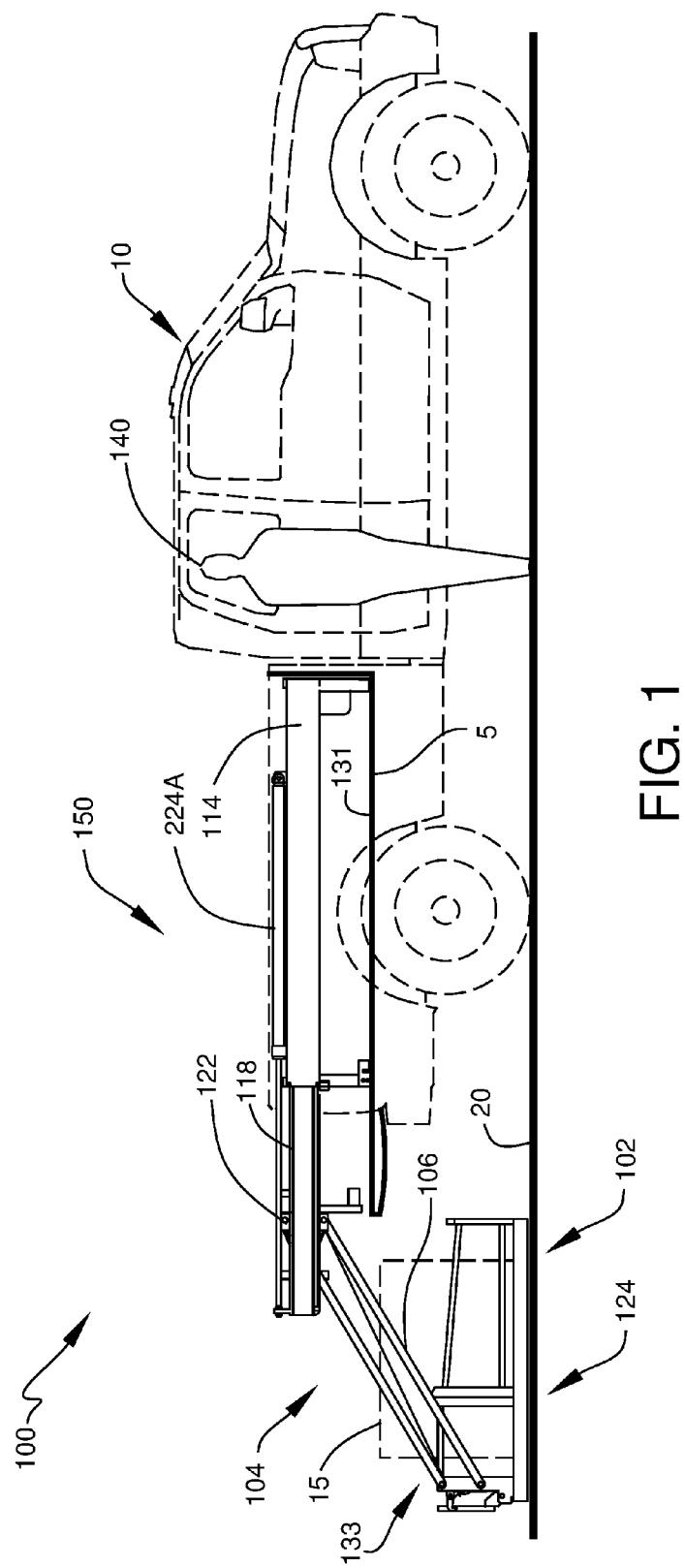
FIG. 1 is a side view of vehicle showing a cargo handling system during an 'in-use' condition, according to an embodiment of the disclosure.

Referring now more specifically to the drawings by numerals of reference, there is shown in FIGS. 1-12, various views of pick-up truck cargo lift system 100. FIG. 1 through FIG. 4 show a pick-up truck cargo lift system 100 installed in the cargo bed 5 of a pickup truck 10 during an 'in-use' condition 150, according to an embodiment of the present disclosure. Pickup truck 10 is shown in dashed-line depiction to allow the pick-up truck cargo lift system 100 to be fully visible within the cargo bed 5. Here, the pick-up truck cargo lift system 100 may be beneficial to user 140 by assisting the user 140 to safely and conveniently load a payload 15 from a ground surface 20 into a cargo bed 5 of a pickup truck 10. FIG. 1 shows the payload 15 supported on a load-supporting platform 102 of a load-lifting assembly 104, which the user 140 has deployed from the cargo bed 5.

In the present disclosure, the payload 15 may comprise a compact off-road vehicle or similar ground-traversing apparatus.

Figure 2:
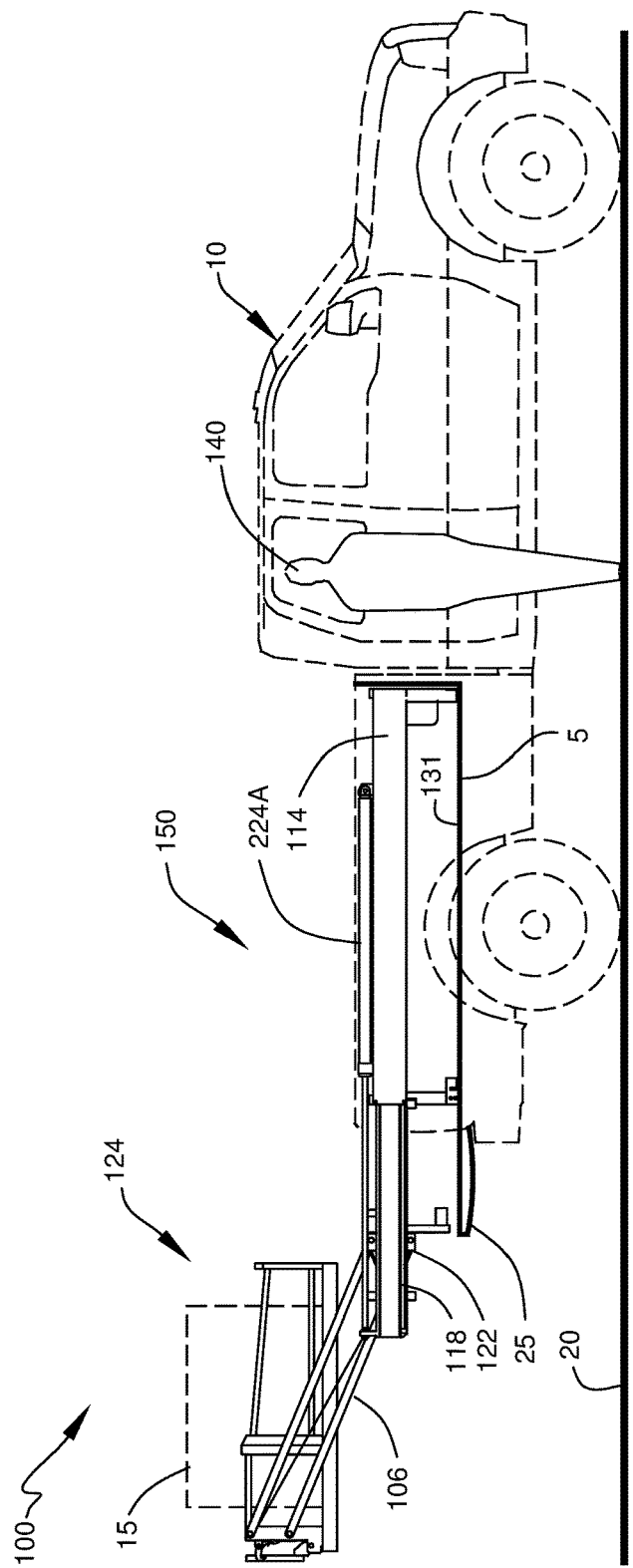
FIG. 2 is the side view of the vehicle and cargo handling system in an alternate configuration, according to the embodiment of FIG. 1.

FIG. 2 shows the payload 15 raised above ground surface 20. An articulated linkage 106 of the load-lifting assembly 104 is configured to maintain the load-supporting platform 102 and the supported payload 15 in a level arrangement through the lifting procedure. FIG. 3 shows the raised load-lifting assembly 104 moved horizontally toward the front of pickup truck 10 to position the load-supporting platform 102 over the cargo bed 5. FIG. 4 shows the load-supporting platform 102 and the supported payload 15 lowered to a stowed position 108 substantially within the cargo bed 5. When not in use, the entire assembly fits within the cargo bed 5; thus, the cargo bed 5 can be protected with a conventional tonneau-type cover or other bed cover devices of a customary design.

FIG. 5 is a perspective view of cargo handling system 100 of FIG. 1, isolated from the vehicle for clarity of description. It is noted that cargo handling system 100 is generally composed of right-side components 110 and left-side components 112. Since many of the right-side components 110 are substantially identically to the opposing left-side components 112, portions of the following descriptions will make reference to one or the other of the component groups, with the understanding that the same disclosure also relates to the opposing side and its associated structures. In the present disclosure, the terms right-side and left-side shall be defined by a person seated in a forward-facing position within the pickup truck 10. It is further noted that some elements of the assemblies (hydraulic lines, electrical conductors, etc.) have been omitted from the views for clarity of description.

As illustrated in FIG. 5, the pick-up truck cargo lift system 100 may include a bed mount 114, a first (left) carriage structure 116, a second (right) carriage structure 118, the load-lifting assembly 104, and a driver assembly 120 configured to power the operation of the system. The load lifting assembly includes a transverse support frame 122 that is movably affixed to the first carriage structure 116 and the second carriage structure 118. The load lifting assembly also includes the payload-supporting load-supporting platform 102, and the articulated linkage 106 linking the load-supporting platform 102 with the support frame 122. The load-supporting platform 102 of the load-lifting assembly 104 is movable between the stowed position 108 substantially within the cargo bed 5, as shown in FIG. 4, and one or more user-selectable deployed positions 124 substantially outside of the cargo bed 5, as shown in FIG. 1 through FIG. 3.

The payload-supporting load-supporting platform 102 may include a pivoting drop gate 126 securable by a set of latches 128, as shown. The pivoting drop gate 126 can be used to restrain the load or may be used to extend the length of the platform when lowered. Under appropriate circumstances, the payload-supporting load-supporting platform 102 may include additional accessories such as, for example, tie-downs to assist in securing the payload to the load-supporting platform, removable or fixed side panels, etc.

The system also includes a remote control 130 configured to operate the driver assembly 120. In preferred embodiments of the present system, the remote control 130 comprises a wireless radio configured to wirelessly issue commands to the driver assembly 120 from the user 140. This feature permits the user 140 to operate the apparatus at a safe distance.

FIG. 6 is a schematic diagram, generally illustrating operational kinematics of the cargo handling system 100, according to the embodiment of FIG. 1. The articulated linkage 106 is configured to articulate the load-supporting platform 102 between the first elevation 131 of the stowed position 108 of FIG. 4 and at least one second elevation 133 associated with the deployed positions 124 of FIG. 2 through FIG. 4. It is again noted that the second elevation 133 of the load-supporting platform 102 may include elevations both above and below the stowed position 108 of the load-supporting platform 102.

Articulated linkage 106 includes pairs of parallel, laterally spaced links 132 and 134, respectively, extending between a side of support frame 122 and a corresponding side of the load-supporting platform 102, as shown. The laterally spaced links are pivotally connected to the support frame 122 at pivot points 136 and 138, respectively, and to the load-supporting platform 102, at pivot points 142 and 144, respectively.

The driver assembly 120 included a set of actuators 146 configured to alter the elevation of the load-supporting platform 102 relative to support frame 122 by applying a force between links 132 and 134. Additional details describing the preferred configuration of the actuators 146 will be provided in FIG. 12.

Support frame 122 comprises a horizontal freedom of movement 148 allowing the load-supporting platform 102 to translate forward and back within cargo bed 5, as shown in FIG. 3. This horizontal freedom of movement 148 allows load-supporting platform 102 to be moved between a position over or within the cargo bed 5 and a position clear of the cargo bed 5. For example, to allow the load-supporting platform 102 to be lowered to the ground position of FIG. 1, the first carriage structure 116 and the second carriage structure 118 move rearward relative to the bed mount 114. At the same time, the support frame 122 moves rearward relative to the first carriage structure 116 and the second carriage structure 118, as shown in FIG. 1. This contemporaneous translational movement places the load-supporting platform 102 fully clear of both cargo bed 5 and tailgate 25 to allow the load-supporting platform 102 to be lowered below the level of the cargo bed 5.

Figure 9:
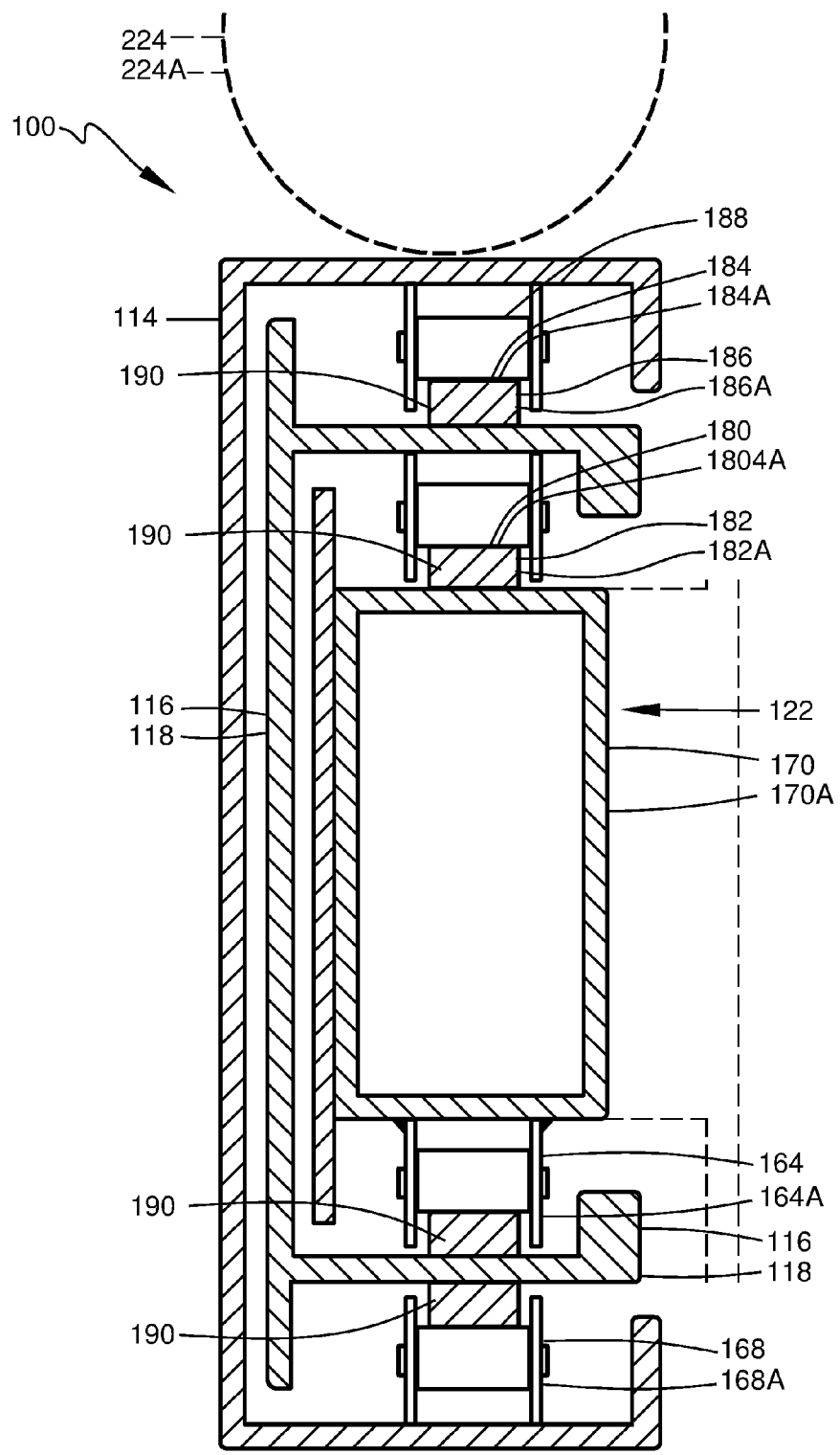
FIG. 9 is a sectional view through the section 9-9 of FIG. 7, illustrating the support structures of FIG. 7, according to the embodiment of FIG. 1.

FIG. 7 is a side view, diagrammatically depicting the telescopically-extendable and retractable operation of the first carriage structure 116, the second carriage structure 118, and support frame 122, according to the embodiment of FIG. 1. FIG. 8 is a side view, diagrammatically illustrating the first carriage structure 116, the second carriage structure 118, and support frame 122 in an extended condition. FIG. 9 is a sectional view through the section 9-9 of FIG. 7, illustrating relationships between the moving and fixed support components.

In reference to FIG. 7 through FIG. 9, the first carriage structure 116 is movably coupled to the bed mount 114 and is translatable between a first retracted position 152, as shown in FIG. 7, and a first extended position 154, as illustrated in FIG. 8. The first retracted position 152 of the first carriage structure 116 is substantially within the cargo bed 5, and forward of the first extended position 154 (see FIG. 4). It is further noted that the bed mount 114 is rigidly mounted to the cargo bed 5, provides structural support to the system components, and does not move relative to cargo bed 5.

Again using the diagrams of FIG. 7 through FIG. 9 to describe the opposing side, the second carriage structure 118 is movably coupled to the bed mount 114 and is translatable between a second retracted position 156, as shown in FIG.

7, and a second extended position 158, as illustrated in FIG. 8. The second retracted position 156, like the first, is located substantially within the cargo bed 5, and forward of the second extended position 158. The load-lifting assembly 104 is movably coupled to and supported by both the first carriage structure 116 and the second carriage structure 118, as shown in FIG. 5.

Pick-up truck cargo lift system 100 incorporates a first movement synchronizer 160 configured to synchronize movement of the first carriage structure 116, the second carriage structure 118, and the load-supporting platform 102 in translation. The first movement synchronizer 160 prevents binding and racking of the support structures during operation, thus allowing their construction to be more compact and lighter in weight.

The first movement synchronizer 160 includes a gear and chain assembly 162 having a first deployment roller chain 164 having a first set of opposing end portions 166, both affixed with the bed mount 114, as shown. A first intermediate chain portion 168 of the first deployment roller chain 164 is affixed to a first side 170 of the support frame 122, shown in FIG. 7, FIG. 8, and FIG. 9. The first intermediate chain portion 168 forms a first chain-loop portion 172 configured to movably engage the first carriage structure 116, as shown. The first intermediate chain portion 168 wraps around an idler assembly 169 mounted to the forward end of the first carriage structure 116.

A first carriage-mounted roller chain 174 is affixed to upper leg of the channel-shaped first carriage structure 116, as shown in a position generally aligned with the first deployment roller chain 164, as shown. A first synchronizer gear 176 of support frame 122 is operably engaged with the first carriage-mounted roller chain 174, as shown in FIG. 7 and FIG. 8.

Using the same diagrammatic illustrations of FIG. 7 through FIG. 9, to describe the opposing side, the first movement synchronizer 160 also includes a second deployment roller chain 164A having a second set of opposing end portions 166A affixed with the bed mount 114, and a second intermediate chain portion 168A affixed to a second side 170A of the support frame 122, as shown. The second intermediate chain portion 168A forms a second chain-loop portion 172A configured to movably engage the second carriage structure 118. In addition, the first movement synchronizer 160 includes a second carriage-mounted roller chain 174A affixed to the second carriage structure 118 and aligned with the second deployment roller chain 164A. A second synchronizer gear 176A is operably engaged with the second carriage-mounted roller chain 174A. A transverse linking shaft 196, also shown in FIG. 10, is configured to link the rotation of the first synchronizer gear 176 with the rotation of the second synchronizer gear 176A. Thus, the relative motion between the right-side translating assemblies and '-side translating assemblies is synchronized during operation.

Each roller chain may be a number 50 roller chain. An arcuate guide block 171 may be used to guide the deployment roller chains around the end of the carriage structures, as shown. Chain tensioners 178 may be used to maintain the roller chains at a selected tension. Both the first synchronizer gear 176 the second synchronizer gear 176A may comprise a 10-tooth (10T) number 50 hub sprocket.

Pick-up truck cargo lift system 100 further includes a group of friction-reducing assemblies to reduce friction between the moving structures. In specific reference to FIG. 9, the first carriage-mounted roller chain 174 includes a first bearing surface 180, the second carriage-mounted roller chain 174A includes a second bearing surface 180A, the support frame 122 of the load-lifting assembly 104 includes a first bearing engager 182 configured to engage the first bearing surface 180 of the first carriage-mounted roller chain 174 during the translation and a second bearing engager 182A configured to engage the second bearing surface 180A of the second carriage-mounted roller chain 174A during the translation.

The bed mount 114 includes a first friction-reducing bearing surface 184 and a second friction-reducing bearing surface 184A, the first carriage structure 116 includes a first bearing surface engager 186 configured to engage the first friction-reducing bearing surface 184 during the translation, and the second carriage structure 118 includes a second bearing surface engager 186A configured to engage the second friction-reducing bearing surface 184A during the translation. Additionally, the first friction-reducing bearing surface 184 and the second friction-reducing bearing surface 184A each comprise a segment of roller chain 188 rigidly fixed to the bed mount 114. In one embodiment of the present disclosure, each roller chain may be a number 50 roller chain of conventional design having an outer roller engaged on an inner bearing and cross pin. Additional bearing engagers are provided at the lower leg of the carriage structures at the first deployment roller chain 164 and the second deployment roller chain 164A, as shown. Each bearing engager consists of an elongated bar segment 190 on which the roller chain engages during translational movement.

In addition, pick-up truck cargo lift system 100 includes a set of low-friction guides 192 configured to guide articulated linkage 106 of the load-lifting assembly 104 during lifting and lowering operations. The low-friction guides 192 are visible in FIG. 5 and FIG. 11. Each guide consists of a rigid back plate supporting a low-friction surface 194. In one preferred embodiment of the present disclosure, the low-friction surface comprises a sheet of ultra-high-molecular-weight polyethylene.

FIG. 10 is a diagrammatic front view of the support frame 122 of the load-lifting assembly 104. FIG. 11 is diagrammatic a side view of the support frame 122 of FIG. 10, according to the embodiment of FIG. 1. Various elements of the assemblies (hydraulic lines, electrical conductor, etc.) have been omitted from the views for clarity of description.

Visible in FIG. 10 and FIG. 11 is the transverse linking shaft 196 linking the rotation of the first synchronizer gear 176 with the rotation of the second synchronizer gear 176A. Also visible in FIG. 10 and FIG. 11 is a second movement synchronizer 198 configured to synchronize the right-side and the left-side actuators 146 of the articulated linkage 106, as described in greater detail in FIG. 12. In one embodiment of the present disclosure, the support frame 122 may be covered by a protective plate (omitted from the view for clarity).

The system further includes an electrically-operated winch 204 configured to assist winching of the payload 15 onto the load-supporting platform 102. The winch 204 may comprise a cable, hook, and fairlead facing the load-supporting platform 102, as shown.

Sub-assemblies of the pick-up truck cargo lift system 100 may be constructed from one or more rigid and durable materials. Sub-assemblies of the pick-up truck cargo lift system 100 may be constructed from one or more metallic materials, such as steel. Sub-assemblies of the pick-up truck cargo lift system 100 may be painted or otherwise protectively coated to prevent corrosion. Sub-assemblies of the pick-up truck cargo lift system 100 may be assembled using mechanical fasteners or by thermal welding. The fixed roller chains 188 may be attached to their respective substrates by thermal welding.

Figure 12:
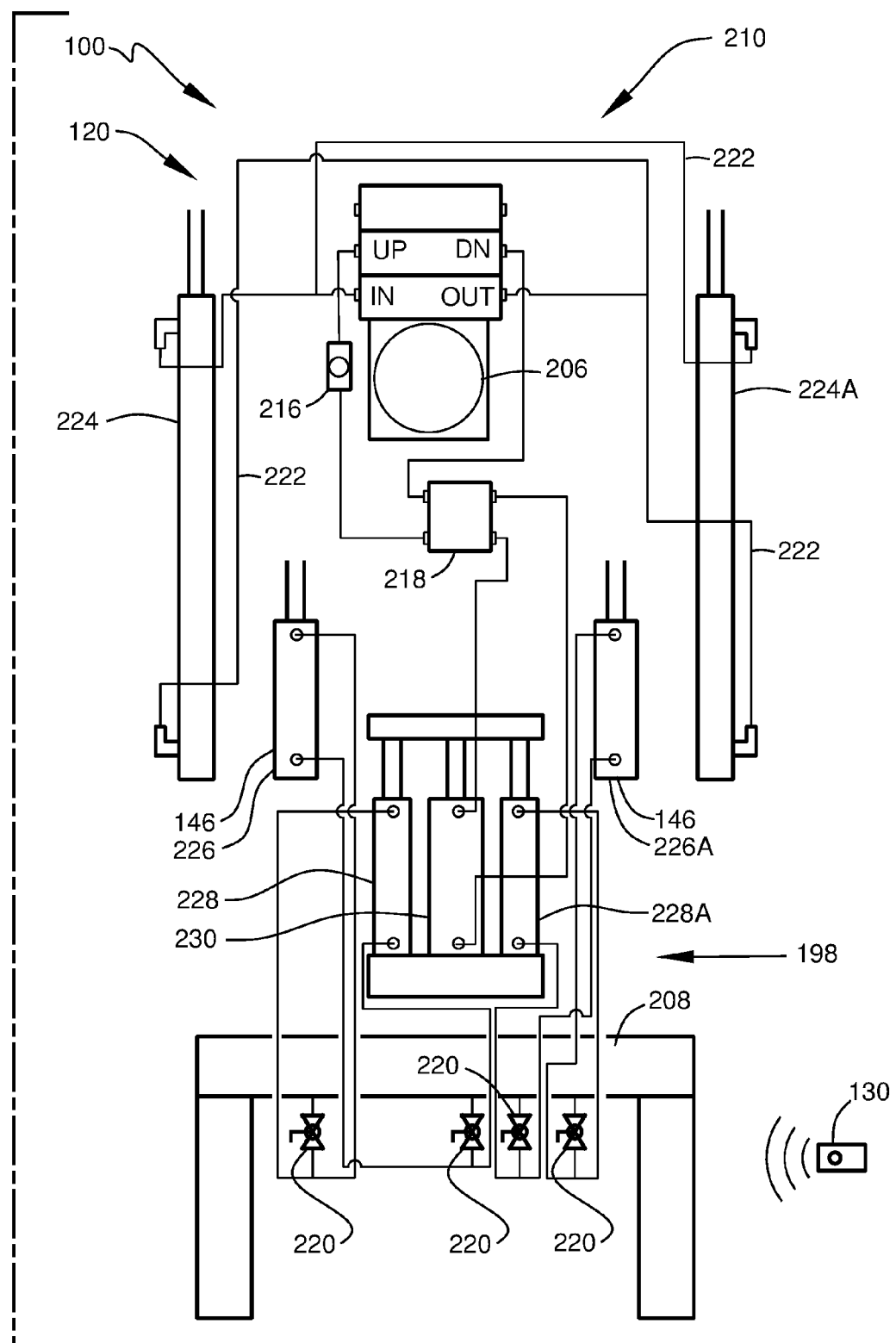
FIG. 12 is a schematic diagram, generally illustrating a hydraulically-actuated driver assembly, according to the embodiment of FIG. 1.

In one embodiment of the present disclosure, the driver assembly 120 is a hydraulically actuated system. FIG. 12 is a schematic diagram, generally illustrating a hydraulically-actuated driver assembly 120, according to the embodiment of FIG. 1. Reference is now made to FIG. 12 and FIG. 5, with continued reference to FIG. 1 through FIG. 11.

Driver assembly 120 includes a source of pressurized hydraulic fluid in the form a hydraulic pump 206 with at least one fluid reservoir 208 and a hydraulic control circuit 210 to control the communication of pressurized hydraulic fluid between the hydraulic components of the system. Such hydraulic components of the system include a translation motor subassembly 212 and an actuator subassembly 214, as shown.

The hydraulic control circuit 210 may include a speed controller 216, counterbalance valve 218, manually-operated ball valves 220, and an arrangement of hydraulic lines 222, among other operational components. Hydraulic pump 206 may be a commercially available unit having an output of about 1.6 cubic centimeters per revolution. Those with ordinary skill in the art will now appreciate that upon reading this specification and by their understanding the art of hydraulic apparatus as described herein, methods of specifying and assembling such systems will be understood by those knowledgeable in such art.

As illustrated in FIG. 7 and FIG. 8, the translation motor subassembly 212 is configured to translate the first carriage structure 116 between the first retracted position 152 and the first extended position 154, the second carriage structure 118 between the second retracted position 156 and the second extended position 158, the load-lifting assembly 104 between the stowed position 108 and the deployed position 124. The translation motor subassembly 212 includes a first hydraulically-actuated cylinder 224 that is operably coupled with the bed mount 114 and the first carriage structure 116 and a second hydraulically-actuated cylinder 224A operably coupled with the bed mount 114 and the second carriage structure 118. The hydraulic control circuit 210 controls the communication of pressurized hydraulic fluid between the hydraulic pump 206, the first hydraulically-actuated cylinder 224, and the second hydraulically-actuated cylinder 224A. Note that hydraulic lines 222 can be routed adjacent the roller chains within the carriage structures, as shown in FIG. 5.

The actuator subassembly 214 is configured to articulate the load-supporting platform 102 between the first elevation 131 of the cargo bed 5 and the second elevation 133 above or below the cargo bed 5. The actuator subassembly 214 includes the actuators 146 of articulated linkage 106 (see FIG. 6), which in the present embodiment include a right-side hydraulically-actuated cylinder 226 and a left-side hydraulically-actuated cylinder 226A, as shown. The right-side hydraulically-actuated cylinder 226 and the left-side hydraulically-actuated cylinder 226A are configured to articulate the load-supporting platform 102 between the stowed position 108 and the deployed position 124 using pressurized hydraulic fluid supplied by the hydraulic pump 206. The hydraulic control circuit 210 controls the communication of pressurized hydraulic fluid between the source of pressurized hydraulic fluid, the right-side hydraulically-actuated cylinder 226 and the left-side hydraulically-actuated cylinder 226A.

The system includes a second movement synchronizer 198 configured to synchronize the articulation of the right-side hydraulically-actuated cylinder 226 and the left-side hydraulically-actuated cylinder 226A. The second movement synchronizer 198 includes a right-side hydraulically-actuated slave cylinder 228 operably coupled to the right-side hydraulically-actuated cylinder 226, a left-side hydraulically-actuated slave cylinder 228A operably coupled to the left-side hydraulically-actuated cylinder 226A, and a hydraulically-actuated master cylinder 230 configured to contemporaneously operate the right-side hydraulically-actuated slave cylinder 228 and the left-side hydraulically-actuated slave cylinder 228A. The hydraulically-actuated master cylinder 230 is operably coupled with hydraulic pump 206 and is controlled by the hydraulic control circuit 210. Upon reading this specification, it should be appreciated that, under appropriate circumstances, considering such issues as user preferences, design preference, structural requirements, marketing preferences, cost, available materials, technological advances, etc., other driver arrangements such as, for example, the use of electrically-driven linear actuators, pneumatic-based actuators, etc., may be sufficient.

The remote control 130 (see FIG. 5) is configured to operate the driver assembly 120. Upon reading this disclosure, it should be appreciated that, under appropriate circumstances, considering such issues as design preference, user preferences, marketing preferences, cost, structural requirements, available materials, technological advances, etc., other control arrangements are contemplated (e.g., wired remote controls, mounted switches, contact switches, other sensors, etc.).

In FIG. 2 and FIG. 3, the second elevation 133 of the load-supporting platform 102 is above the first elevation 131 of the load-supporting platform 102 shown in FIG. 4. As shown in FIG. 1, the second elevation 133 of the load-supporting platform 102 may below the first elevation 131. In the stowed position 108 of FIG. 4, the load-supporting platform 102 is substantially within the cargo bed 5 of the pickup truck 10. While in the deployed position 124 of FIG. 1 through FIG. 3, the load-supporting platform 102 is substantially outside the cargo bed 5 of the pickup truck 10. Thus, the load-supporting platform 102 includes the first elevation 131 when in the stowed position 108, and the second elevation 133 of the load-supporting platform 102 includes elevations above and below the stowed position 108 of the load-supporting platform 102.

According to one embodiment, the pick-up truck cargo lift system 100 may be arranged as a kit 105, as shown in FIG. 5. In particular, the pick-up truck cargo lift system 100 may further include a set of instructions 155. The instructions 155 may detail functional relationships in relation to the structure of the pick-up truck cargo lift system 100 (such that the pick-up truck cargo lift system 100 can be used, maintained, or the like, in a preferred manner).

It is understood the pick-up truck cargo lift system 100 may be manufactured and provided for sale in a wide variety of sizes and shapes for a wide assortment of applications. Upon reading this disclosure, it should be appreciated that, under appropriate circumstances, considering such issues as design preference, user preferences, marketing preferences, cost, structural requirements, available materials, technological advances, etc., other kit contents or arrangements are contemplated (e.g., more or less named components, customized parts, different color combinations, individual parts provided separately, etc.).

Figure 13:
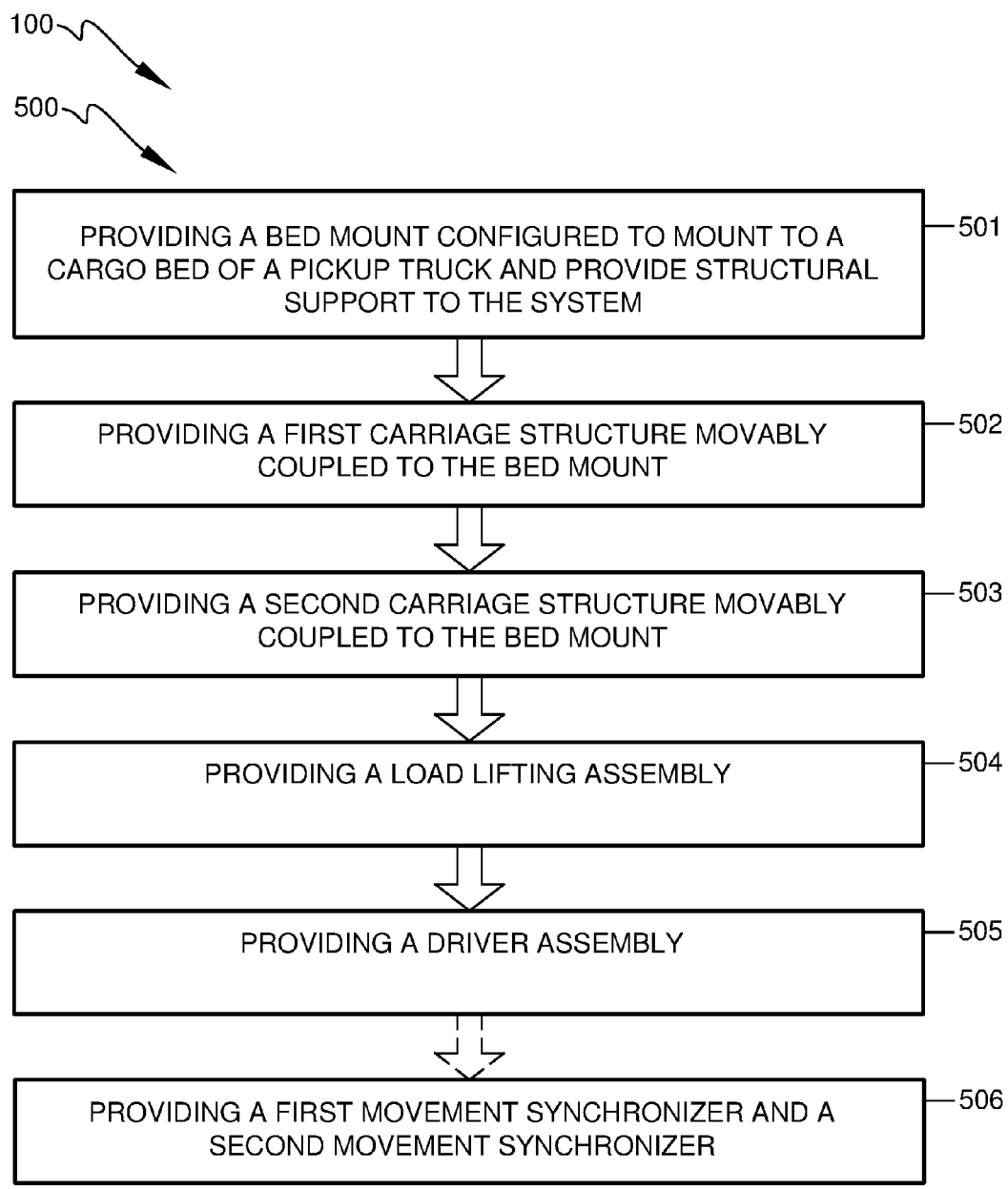
FIG. 13 is a flow diagram illustrating a method of implementing the cargo handling system, according to an embodiment of the present disclosure The various embodiments of the present disclosure will hereinafter be described in conjunction with the appended drawings, wherein like designations denote like elements.

FIG. 13 is a flow diagram illustrating a method for material handling, according to an embodiment of the present disclosure. In particular, the method for vehicle loading 500 may include one or more components or features of the pick-up truck cargo lift system 100 as described above. As illustrated, the method for vehicle loading 500 may include the steps of: step one 501, providing a bed mount configured to mount to a cargo bed of a pickup truck and provide structural support to the system; step two 502, providing a first carriage structure movably coupled to the bed mount, the first carriage structure translatable between a first retracted position and a first extended position, the first retracted position being substantially within the cargo bed, and forward of the first extended position; step three 503, providing a second carriage structure movably coupled to the bed mount, the second carriage structure translatable between a second retracted position and a second extended position, the second retracted position being substantially within the cargo bed, and forward of the second extended position; step four 504, providing a load lifting assembly coupled to and supported by the first carriage structure and the second carriage structure, the load lifting assembly movable between a stowed position substantially within the cargo bed, and a deployed position substantially outside of the cargo bed, the load lifting assembly including a support frame movably affixed to the first carriage structure and the second carriage structure, a load-supporting platform configured to support a payload of the cargo bed, and an articulated linkage linking the load-supporting platform with the support frame, the articulated linkage configured to articulate the load-supporting platform between a first elevation and a second elevation; and step five 505, providing a driver assembly configured to translate the first carriage structure between the first retracted position and the first extended position, the second carriage structure between the second retracted position and the second extended position, the load lifting assembly between the stowed position and the deployed position, and further configured to articulate the load-supporting platform between the first elevation and the second elevation.

The method for vehicle loading 500 may also include the steps of: step six 506, providing a first movement synchronizer to synchronize movement of the first carriage structure, the second carriage structure, and the load-supporting platform in translation, and a second movement synchronizer to synchronize the articulation of the right-side actuator and the left-side actuator, the second movement synchronizer. It should be noted that step 506 is an optional step and may not be implemented in all cases. Optional steps of method 500 are illustrated using dotted lines in FIG. 5 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for loading a vehicle (e.g., different step orders within above-mentioned list, elimination or addition of certain steps, including or excluding certain maintenance steps, etc.), are taught herein.

The embodiments of the disclosure are exemplary and numerous. Modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public (particularly, scientists, engineers and practitioners in the art who are not familiar with patent or legal terms or phraseology) to determine quickly from a cursory inspection the nature and essence of the technical disclosure.

What is claimed is new and desired to be protected by Letters Patent is set forth in the appended claims:

1. A system for loading a cargo bed of a pickup truck, the system comprising:
   a bed mount configured to mount to the cargo bed and provide structural support to the system;
   a first carriage structure movably coupled to the bed mount, said first carriage structure translatable between a first retracted position and a first extended position, the first retracted position being substantially within the cargo bed, and forward of said first extended position;
   a second carriage structure movably coupled to the bed mount, said second carriage structure translatable between a second retracted position and a second extended position, the second retracted position being substantially within the cargo bed, and forward of said second extended position;
   a load lifting assembly coupled to and supported by the first carriage structure and the second carriage structure, said load lifting assembly movable between a stowed position substantially within the cargo bed, and a deployed position substantially outside of the cargo bed, said load lifting assembly including
      a support frame movably affixed to the first carriage structure and the second carriage structure,
      a load-supporting platform configured to support a payload of the cargo bed, and
      an articulated linkage linking said load-supporting platform with said support frame, said articulated linkage configured to articulate said load-supporting platform between a first elevation of the stowed position and a second elevation of the deployed position;
   a first movement synchronizer configured to synchronize movement of the first carriage structure, the second carriage structure, and the load-supporting platform in translation
wherein said movement synchronizer comprises a gear and chain assembly including:
   a first deployment roller chain having a first set of opposing end portions affixed with said bed mount and a first intermediate chain portion affixed to a first side of said support frame, said first intermediate chain portion forming a first chain-loop portion configured to movably engage said first carriage structure,
   a first carriage-mounted roller chain affixed to said first carriage structure and aligned with said first deployment roller chain,
   a first synchronizer gear operably engaged with said first carriage-mounted roller chain,
   a second deployment roller chain having a second set of opposing end portions affixed with said bed mount and a second intermediate chain portion affixed to a second side of said support frame, said second intermediate chain portion forming a second chain-loop portion configured to movably engage said second carriage structure,
   a second carriage-mounted roller chain affixed to said second carriage structure and aligned with said second deployment roller chain, and
   a second synchronizer gear operably engaged with said second carriage-mounted roller chain, and a linking shaft configured link the rotation of said first synchronizer gear with the rotation of said second synchronizer gear; and a driver assembly configured to translate the first carriage structure between the first retracted position and the first extended position, the second carriage structure between the second retracted position and the second extended position, the load lifting assembly between the stowed position and the deployed position, and further configured to articulate the load-supporting platform between the first elevation and the second elevation.

2. The system of claim 1, wherein
the first carriage-mounted roller chain comprises a first bearing surface,
the second carriage-mounted roller chain comprises a second bearing surface,
the support frame of the load lifting assembly comprises a first bearing engager configured to engage the first bearing surface of the first carriage-mounted roller chain during the translation and a second bearing engager configured to engage the second bearing surface of the second carriage-mounted roller chain during the translation.

3. The system of claim 1, wherein the driver assembly includes
a translation motor subassembly configured to translate the first carriage structure between the first retracted position and the first extended position, the second carriage structure between the second retracted position and the second extended position, the load lifting assembly between the stowed position and the deployed position, and
an actuator subassembly configured to articulate the load-supporting platform between the first elevation and the second elevation.

4. The system of claim 3, wherein the translation motor subassembly comprises
a first hydraulically-actuated cylinder operably coupled with said bed mount and said first carriage structure,
a second hydraulically-actuated cylinder operably coupled with said bed mount and said second carriage structure,
a source of pressurized hydraulic fluid, and
a hydraulic control circuit to control the communication of pressurized hydraulic fluid between said source of pressurized hydraulic fluid, said first hydraulically-actuated cylinder, and said second hydraulically-actuated cylinder.

5. The system of claim 3, wherein
the pickup truck has a right-side and a left-side;
the actuator subassembly includes a right-side hydraulically-actuated cylinder and a left-side hydraulically-actuated cylinder, the right-side hydraulically-actuated cylinder and the left-side hydraulically-actuated cylinder configured to articulate the load-supporting platform between the stowed position and the deployed position,
a source of pressurized hydraulic fluid, and
a hydraulic control circuit to control the communication of pressurized hydraulic fluid between the source of pressurized hydraulic fluid, a right-side actuator, and a left-side actuator.

6. The system of claim 5 further comprising a second movement synchronizer configured to synchronize the articulation of the right-side actuator and the left-side actuator, the second movement synchronizer including a right-side hydraulically-actuated slave cylinder operably coupled to the
right-side hydraulically-actuated cylinder,
left-side hydraulically-actuated slave cylinder operably coupled to the a left-side hydraulically-actuated cylinder,
a hydraulically-actuated master cylinder configured to contemporaneously operate the right-side hydraulically-actuated slave cylinder and the left-side hydraulically-actuated slave cylinder, the hydraulically-actuated master cylinder operably coupled with the source of pressurized hydraulic fluid and controlled by the hydraulic control circuit.

7. The system of claim 1, wherein
the bed mount comprises a first friction-reducing bearing surface and a second friction-reducing bearing surface,
the first carriage structure comprises a first bearing surface engager configured to engage the first friction-reducing bearing surface during the translation, and
the second carriage structure comprises a second bearing surface engager configured to engage the second friction-reducing bearing surface during the translation.

8. The system of claim 7, wherein the first friction-reducing bearing surface and the second friction-reducing bearing surface each comprise a segment of roller chain rigidly fixed to the bed mount.

9. The system of claim 1, further comprising a remote control configured to operate the driver assembly.

10. The system of claim 9, wherein the remote control includes a wireless radio configured to wirelessly issue commands to the driver assembly.

11. The system of claim 1, wherein the second elevation of the load-supporting platform is above the first elevation of the load-supporting platform.

12. The system of claim 1, wherein the second elevation of the load-supporting platform is below the first elevation of the load-supporting platform.

13. The system of claim 1, wherein
the stowed position of the load-supporting platform is substantially within the cargo bed of the pickup truck,
the deployed position of the load-supporting platform is substantially outside the cargo bed of the pickup truck,
the load-supporting platform comprises the first elevation when in the stowed position, and
the second elevation of the load-supporting platform includes elevations above and below the stowed position of the load-supporting platform.

14. The system of claim 1, further comprising a winch configured to assist winching of the payload onto the load-supporting platform.

15. A system for loading a cargo bed of a pickup truck, the system comprising:
a bed mount configured to mount to the cargo bed and provide structural support to the system;
a first carriage structure movably coupled to the bed mount, said first carriage structure translatable between a first retracted position and a first extended position, the first retracted position being substantially within the cargo bed, and forward of said first extended position;
a second carriage structure movably coupled to the bed mount, said second carriage structure translatable between a second retracted position and a second extended position, the second retracted position being substantially within the cargo bed, and forward of said second extended position;
a load lifting assembly coupled to and supported by the first carriage structure and the second carriage structure, said load lifting assembly movable between a stowed position substantially within the cargo bed, and a deployed position substantially outside of the cargo bed, said load lifting assembly including
a support frame movably affixed to the first carriage structure and the second carriage structure,
a load-supporting platform configured to support a payload of the cargo bed, and
an articulated linkage linking said load-supporting platform with said support frame, said articulated linkage configured to articulate said load-supporting platform between a first elevation and a second elevation; and
a driver assembly configured to translate the first carriage structure between the first retracted position and the first extended position, the second carriage structure between the second retracted position and the second extended position, the load lifting assembly between the stowed position and the deployed position, and further configured to articulate the load-supporting platform between the first elevation and the second elevation;
further comprising a first movement synchronizer configured to synchronize movement of the first carriage structure, the second carriage structure, and the load-supporting platform in translation;
wherein said movement synchronizer comprises a gear and chain assembly including
a first deployment roller chain having a first set of opposing end portions affixed with said bed mount and a first intermediate chain portion affixed to a first side of said support frame, said first intermediate chain portion forming a first chain-loop portion configured to movably engage said first carriage structure,
a first carriage-mounted roller chain affixed to said first carriage structure and aligned with said first deployment roller chain,
a first synchronizer gear operably engaged with said first roller chain and said first carriage-mounted roller chain,
a second deployment roller chain having a second set of opposing end portions affixed with said bed mount and a second intermediate chain portion affixed to a second side of said support frame, said second intermediate chain portion forming a second chain-loop portion configured to movably engage said second carriage structure,
a second carriage-mounted roller chain affixed to said second carriage structure and aligned with said second deployment roller chain,
a second synchronizer gear operably engaged with said second carriage-mounted roller chain, and
coupled to said first synchronizer gear and said second synchronizer gear, a linking shaft configured link the rotation of said first synchronizer gear with the rotation of said second synchronizer gear;
wherein
the first carriage-mounted roller chain comprises a first bearing surface,
the second carriage-mounted roller chain comprises a second bearing surface,
the support frame of the load lifting assembly comprises a first bearing engager configured to engage the first bearing surface of the first carriage-mounted roller chain during the translation and a second bearing engager configured to engage the second bearing surface of the second carriage-mounted roller chain during the translation;

wherein the driver assembly includes
a translation motor subassembly configured to translate the first carriage structure between the first retracted position and the first extended position, the second carriage structure between the second retracted position and the second extended position, the load lifting assembly between the stowed position and the deployed position, and
an actuator subassembly configured to articulate the load-supporting platform between the first elevation and the second elevation;
wherein the translation motor subassembly comprises
a first hydraulically-actuated cylinder operably coupled with said bed mount and said first carriage structure,
a second hydraulically-actuated cylinder operably coupled with said bed mount and said second carriage structure,
a source of pressurized hydraulic fluid, and
a hydraulic control circuit to control the communication of pressurized hydraulic fluid between said source of pressurized hydraulic fluid, said first hydraulically-actuated cylinder, and said second hydraulically-actuated cylinder;
wherein the pickup truck has a right-side and a left-side;
the actuator subassembly includes a right-side hydraulically-actuated cylinder and a left-side hydraulically-actuated cylinder, the right-side hydraulically-actuated cylinder and the left-side hydraulically-actuated cylinder configured to articulate the load-supporting platform between the stowed position and the deployed position,
a source of pressurized hydraulic fluid, and
a hydraulic control circuit to control the communication of pressurized hydraulic fluid between the source of pressurized hydraulic fluid, the right-side actuator, and the left-side actuator;
further comprising a second movement synchronizer configured to synchronize the articulation of the right-side actuator and the left-side actuator, the second movement synchronizer including
a right-side hydraulically-actuated slave cylinder operably coupled to the right-side hydraulically-actuated cylinder,
a left-side hydraulically-actuated slave cylinder operably coupled to the left-side hydraulically-actuated cylinder,
a hydraulically-actuated master cylinder configured to contemporaneously operate the right-side hydraulically-actuated slave cylinder and the left-side hydraulically-actuated slave cylinder, the hydraulically-actuated master cylinder operably coupled with the source of pressurized hydraulic fluid and controlled by the hydraulic control circuit;
wherein the bed mount comprises a first friction-reducing bearing surface and a second friction-reducing bearing surface,
the first carriage structure comprises a first bearing surface engager configured to engage the first friction-reducing bearing surface during the translation, and
the second carriage structure comprises a second bearing surface engager configured to engage the second friction-reducing bearing surface during the translation;
wherein the first friction-reducing bearing surface and the second friction-reducing bearing surface each comprise a segment of roller chain rigidly fixed to the bed mount;
further comprising a remote control configured to operate the driver assembly, wherein the remote control includes a wireless radio configured to wirelessly issue commands to the driver assembly;

wherein the stowed position of the load-supporting platform is substantially within the cargo bed of the pickup truck,
the deployed position of the load-supporting platform is substantially outside the cargo bed of the pickup truck,
the load-supporting platform comprises the first elevation when in the stowed position, and
the second elevation of the load-supporting platform includes elevations above and below the stowed position of the load-supporting platform; and further comprising a winch configured to assist winching of the payload onto the load-supporting platform.

16. The vehicle loading system of claim 15, further comprising a set of instructions; and wherein the system is arranged as a kit.

* * * * *